March 30, 1926. 1,578,987
F. A. HAMILTON
SPARE TIRE CARRYING AND RIM REMOVING DEVICE
Filed July 22, 1924 2 Sheets-Sheet 1
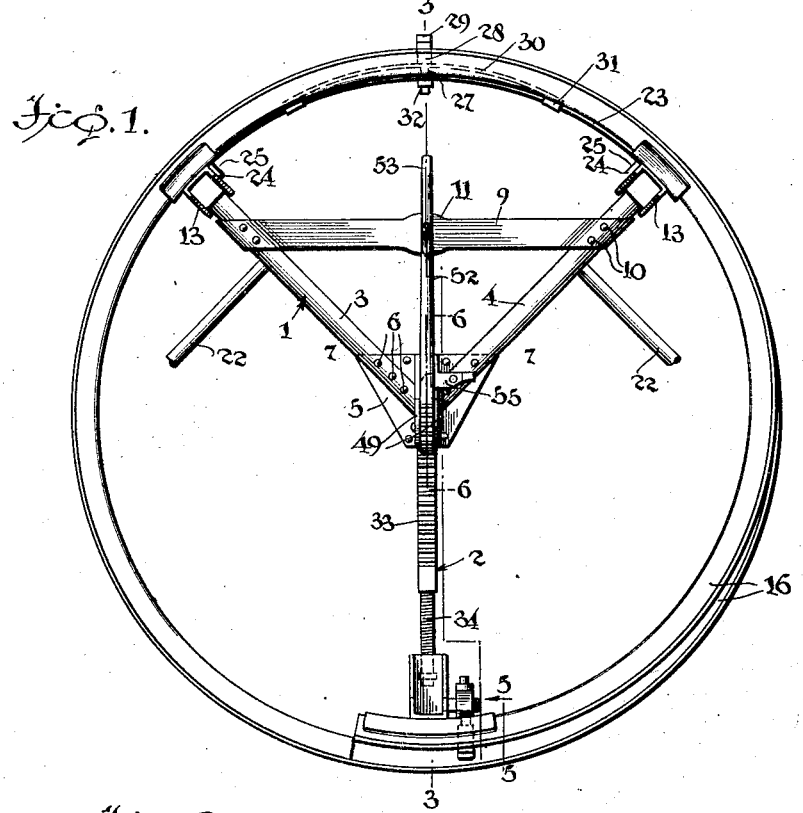
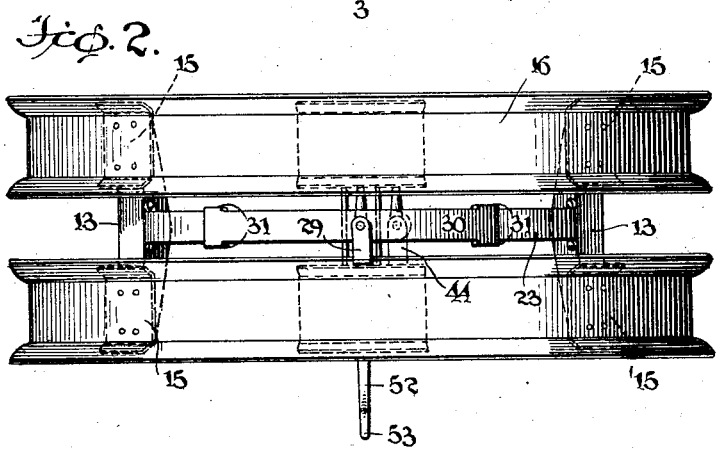
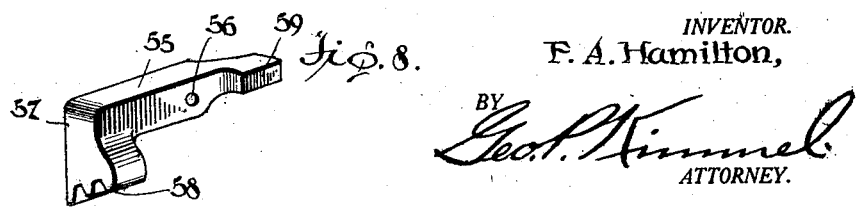
INVENTOR.
F. A. Hamilton,
BY
Geo. F. Kimmel
ATTORNEY.

March 30, 1926. 1,578,987
F. A. HAMILTON
SPARE TIRE CARRYING AND RIM REMOVING DEVICE
Filed July 22, 1924 2 Sheets-Sheet 2
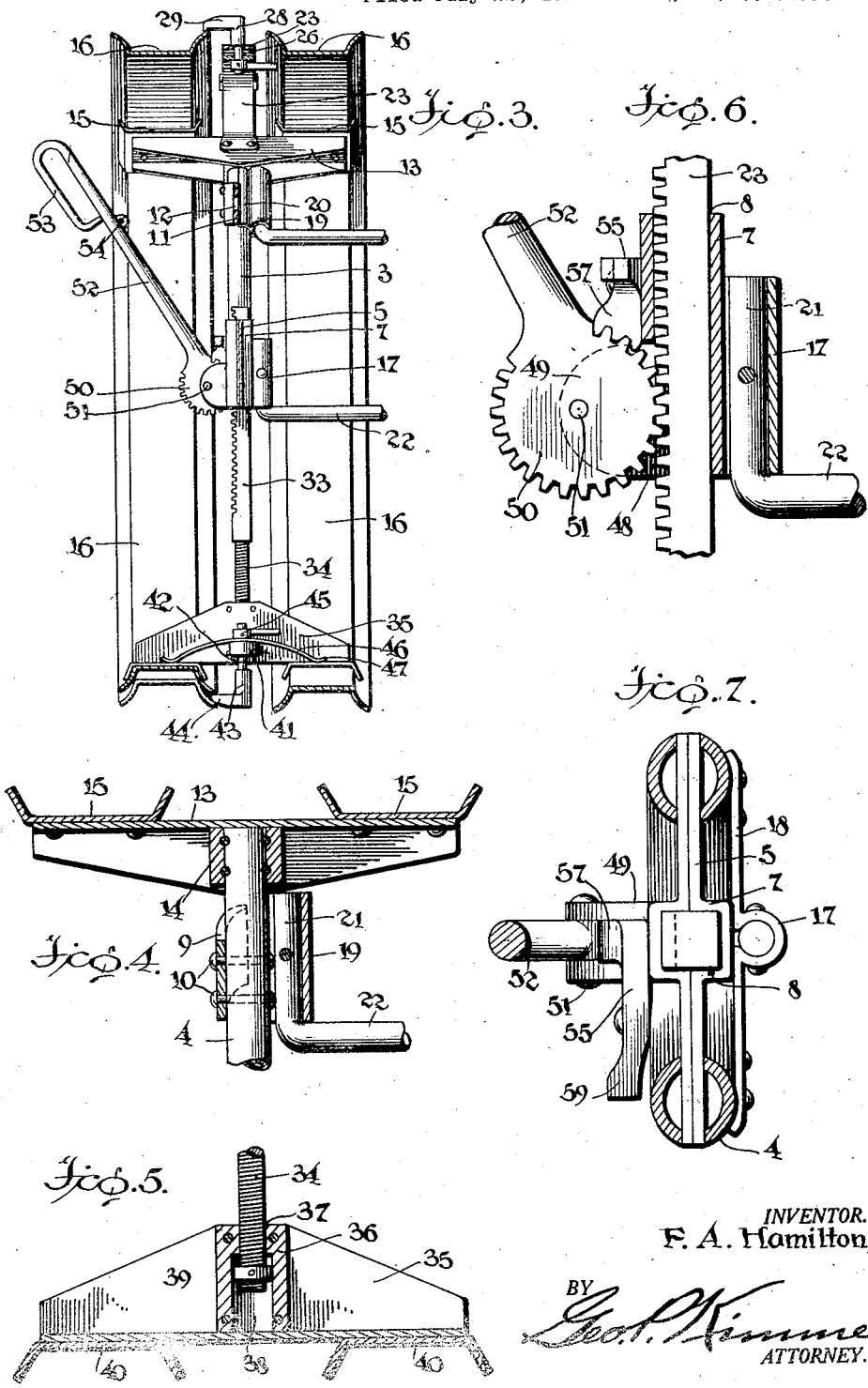
INVENTOR.
F. A. Hamilton,
BY
Geo. P. Kimmel
ATTORNEY.

Patented Mar. 30, 1926.

1,578,987

UNITED STATES PATENT OFFICE.

FRANKLIN A. HAMILTON, OF THREE FORKS, MONTANA.

SPARE-TIRE CARRYING AND RIM-REMOVING DEVICE.

Application filed July 22, 1924. Serial No. 727,511.

*To all whom it may concern:*

Be it known that I, FRANKLIN A. HAMILTON, a citizen of the United States, residing at Three Forks, in the county of Gallatin and State of Montana, have invented certain new and useful Improvements in Spare-Tire Carrying and Rim-Removing Devices, of which the following is a specification.

This invention re'ates to a spare tire carrying and rim removing device designed to be carried upon motor driven vehicles.

This invention is an improvement upon the structure disclosed in the allowed Patent No. 1,499,156, which issued June 24, 1924.

The primary object of this invention is the provision, in a manner as hereinafter set forth, of a spare tire carrier for motor driven vehicles having combined therewith a means whereby a rim carried upon the carrier may be easily broken and a tire removed therefrom, easily and quickly without the necessity of laying the tire and the rim upon the ground as is necessary in the present method.

Another object of the invention is the provision, in a manner as hereinafter set forth, of a spare tire carrier for motor vehicles, having means whereby the throwing of a single lever will release the tire for removal from the carrier, and further having means whereby a single throw of the same lever, after proper adjustment of certain parts of the carrier, will break the rim of a tire to allow the same to be removed therefrom without taking the rim from the carrier.

A still further object of this invention is the provision, in a manner as hereinafter set forth, of a spare tire carrier for motor vehicles so constructed that by the throwing of a single lever, one or more spare tires may be securely clamped upon the carrier or may be released for removal therefrom, and having further means whereby, by the throwing of the same lever, after proper adjustment of certain parts of the carrier, a tire rim may be broken and indefinitely held in the broken position to free both hands of the operator while he lifts the released tire from the broken rim.

This invention contemplates the provision of an upright substantially V-shaped member connected between its divergent free ends by an arcuate shaped bar, with each divergent end carrying thereon a transverse head which in turn carries two or more cradle members adapted to receive a tire rim. This V-shaped member is rigidly secured in position upon the body of a vehicle and it has working vertically through the lower portion or apex thereof a rack bar which likewise carries at its free lower end a shiftable foot member in turn carrying two or more cradles similar to those above referred to. The said foot is threaded upon the rack bar to allow it to be adjusted for any size rim which one might desire to carry upon the carrier. A pinion is pivotally supported in front of the carrier at the central portion thereof, that is, at the apex of said V-shaped member, and this pinion engages the said rack bar and has extending therefrom a lever which when swung up or down, raises or lowers the rack bar and the foot carried at the lower end thereof to release or clamp a rim in position upon the carrier. Means is provided for locking the bar to prevent the removal of tires and rims from the carrier. Carried upon the shiftable foot and also upon and at the central portion of the arcuate connecting bar is a shiftable hook member adapted to be engaged over the edge of a tire rim when it is desired to break the rim to remove a tire therefrom. When these hook members are engaged over the edge of a rim, and the said lever swung downwardly to revolve the pinion and lift the rack, the shiftable foot, instead of coming free from the rim, will draw the rim upwardly with it upon one side of the point at which it breaks and thus contract the same sufficiently to allow the tire to be removed therefrom.

Provision is made for holding the swinging bar in position with the foot raised and the rim in broken position so that both hands of the operator may be free to work upon the tire, and provision is also made to prevent the hook members from rattling and becoming noisy when they are disengaged from the rims upon the carrier and the machine carrying the same is in motion.

A further and final object of this invention is the provision, in a manner as hereinafter set forth, of a combined tire carrier and rim remover for use upon motor vehicles, which will be of simple construction, of as light weight as is commensurate with strength and durability, neat and attractive in appearance, easily operated and inexpensive to manufacture and set up.

The invention will be best understood from a consideration of the following detailed description taken in connection with the accompanying drawings forming part of this specification, with the understanding that the invention is not confined to any strict conformity with the showing of the drawings but may be changed and modified so long as such changes and modifications mark no material departure from the salient features of the invention as expressed in the appended claims.

In the drawings:

Figure 1 is a front elevation of the device embodying this invention, showing a pair of tire rims supported thereon, one of said rims being shown as held in broken position by the device.

Figure 2 is a top plan view of the device.

Figure 3 is a section taken upon the line 3—3 of Figure 1.

Figure 4 is a section upon the line 4—4 of Figure 1.

Figure 5 is a section upon the line 5—5 of Figure 1.

Figure 6 is a section upon the line 6—6 of Figure 1.

Figure 7 is a section upon the line 7—7 of Figure 1.

Figure 8 is a detail perspective view of a locking dog which operates to secure certain parts of the device when the same is holding a rim in broken condition upon the carrier.

Referring now to the drawings in detail wherein like numerals of reference indicate corresponding parts throughout the several views of the drawings, there is shown a substantially V-shaped body member, indicated as a whole by the numeral 1, which body member has associated therewith and depending from the apex thereof a lower vertically shiftable structure, indicated as a whole by the numeral 2.

The member 1 comprises a pair of upwardly divergent arms 3 and 4, respectively, which are joined together at the convergent lower ends by the substantially triangular plate 5. These arms 3 and 4 are preferably made of tubular material as this structure will greatly lessen the weight of the finished device and will not detract from the strength of the device. The arms 3 and 4 are here shown as being split at their lower ends to allow the plate 5 to extend therethrough and be secured in position by means of the rivets 6. However, applicant does not limit himself to this structure for the plate 5 and the arms 3 and 4 may be cast as an integral structure if it is desired to do so.

The plate 5 is enlarged through its central portion as indicated at 7 and the vertical rectangular aperture 8 is formed through this enlarged portion and extends throughout the length of the plate opening at the upper and lower portions thereof. The purpose of this passage 8 will become apparent as the description of the device proceeds.

Extending between and connecting the divergent arms 3 and 4 at a point adjacent their upper ends, is a brace bar 9, here shown as having its ends turned about the arms and secured thereto by means of the rivets 10. This brace bar may, however, be formed integral with the arms 3 and 4 in the same manner as the plate 5. The central portion of this bar 9 is enlarged as at 11 and has formed therethrough a vertical slot 12, as shown in Figure 3 of the drawings.

Upon the terminal upper end of each of the arms 3 and 4, there is secured a channel member 13 constituting a head, these channel members having formed in their channels, midway between their ends, the blocks 14 having a bore therein in which the end of the arm is inserted and secured. Each of these heads 13 has secured thereto one, two or more cradles 13 across and in which a tire rim 16 is supported.

Secured upon the back of the plate 5 is a vertically positioned sleeve 17 having the laterally extending wings 18, which are secured across and between the lower portions of the arms 3 and 4 and across the enlarged portions 7 of the plate. Upon each of the arms 3 and 4 adjacent the underside of the head carried thereon, is a similar sleeve member 19 which extends longitudinally of and parallel with the arms to which it is attached by means of the outturned portions 20 which are riveted to the arms or otherwise secured thereto in any appropriate manner. These sleeves 17 and 19 are adapted to receive therein the right angled end portions 21 of supporting bars 22 which extend and are secured to the body of the machine upon which the device is carried.

Extending between the head members 13 which are carried upon the terminal ends of the arms, is an arcuate bar of substantial size as indicated at 23, this bar has its terminal ends turned downwardly at right angles as indicated at 24 and secured by means of the rivets 25 to the inner face of one of the heads 13. This arcuate bar 23 has formed through the central portion thereof at a point midway between its ends and directly above the passage 8 in the plate 5 an aperture 26. Extending through this aperture 26 is a reduced portion 27 of the shank 28 of a right angularly extending hook 29. Engaged about the reduced portion 27 of the shank 28, is an arcuate spring 30, which is formed upon a lesser arc than the member 23 and this spring 30 has its extended ends provided with the overturned side ears 31, which clamp over the edge of the bar 23 and secure the spring thereto.

This spring has a normal tendency to rise upwardly at the central portion against the shank 28 which draws the finger nut 32, which is threadably carried upon the lower end of the reduced portion 27, up against the underside of the bar 23 and thus prevent the hook member from rattling when the same is disengaged from the tire rim and the machine is in motion.

Extending through and adapted for vertical reciprocation in the passage 8 of the enlarged portion 7 of the plate 5 is a rack bar 33, the lower end of which is reduced and provided with screw threads as indicated at 34.

At the lower end of the threaded reduced portion 34 of the rack bar 23 is a foot 35 similar to the head members 13 and like these members, formed of channel iron material, and this foot has at its central portion in the channel between the walls thereof a block 36 having a central bore therethrough, which bore at its upper and outer end, is of small diameter as indicated at 27 and threaded to receive the reduced portion 34, and at its lower end is of a large diameter as at 38 to receive therein a collar 39 which is secured to the end of the reduced portion 34 and acts to prevent the same from being unscrewed or disconnected from the block by preventing the same from entirely passing through the bore 37.

As clearly shown, upon reference to Figure 1 or to Figure 3, the foot 35 has its channel directed upwardly, whereas the heads 13 have their channels directed downwardly, thus turning the faces of the channel members outwardly and directing them toward the inner face of the rim carried on the carrier. The foot 35, like the members 13, has secured thereto cradle members 40 which cooperate with the cradles 15, carried by the head members, to suspend the rim and tire in position.

Extending outwardly from one side of the foot 35 is an apertured lug 41 through which aperture there extends the reduced portion 42 of the shank 43 of a hook member 44. This reduced portion 42 has threaded upon the upper end thereof a finger nut 45 by means of which the hook 44 may be drawn up to engage one of the rims 16 carried in the cradles 15 and 40.

Extending over and bridging the lug 41 is an arcuate spring 46, the ends of which are turned slightly as at 47 and bear against the back of the cradles 40. This spring 46 has a central aperture therethrough midway the ends thereof and the reduced portion 42 of the shank 43 extends through this aperture, and this spring bears against the underside of the finger nut 45 and normally tends to raise the hook 44 until the shank 43 engages the underside of the lug 41 and holds the same in this position to prevent the rattling of the hook member when disengaged from the rim 16 and when the machine carrying the device is in motion.

The lower portion of the outer wall of the passage 8 is cutaway as at 48, and extending outwardly from each side of this cutaway portion is an apertured ear 49. These ears are in alignment and the apertures therein are in alignment and there is positioned between these ears the small gear 50 pivotally mounted therebetween upon the pivot pin 51. The teeth of this gear 50 engage the teeth of the rack bar 33 as shown in Figure 6, and there is extended from the periphery of this gear the arm or lever 52 which is enlarged or looped at its outer end as at 53 to provide a hand grip.

The inner side of the lever 52 has formed thereon the apertured lug 54 which, when the lever is in raised or upright position, extends through the aperture 12 in the cross bar 9 and is adapted to have passed therethrough a lock or other securing element to lock the tire carrier. It will be seen that when the lever 52 is drawn downwardly, the rack bar 33 will be raised through the passage 8, to lift the foot from engagement with the rims 16 as shown in Figure 3, and either of the rims can then be removed from the carrier.

Pivotally secured to the outer face of the plate 5 is a locking dog 55 having an aperture 56 therethrough for the pivot pin, and this dog 55 normally extends horizontally across the plate as shown in Figure 1 and has upon its inner end, which is positioned over the gear 50, the enlarged depending head 57, the lower face of which is curved and provided with teeth 58. The other end of the dog is turned outwardly as at 59 to provide a finger grip. The curve in the lower face of the head 57 corresponds to the curve of the gear 50, and as shown in Figure 6, it is intended that when the teeth 58 engage with the teeth of the gear 50, they will follow the curvature of the gear and thus have all of their teeth in engagement with the gear, at the same time causing the back of the dog to lie flat against the plate as is clearly shown in this figure. This dog is used as a locking device for the gear 50 and the rack 33 to retain the same in a set position during a certain operation of the device which operation will be described.

The operation of this device is as follows:

After the carrier has been secured in position upon the body of the motor vehicle, and it is desired to place the extra or spare tires thereon, the foot 35 is revolved to raise or lower the same upon the reduced portion 34 of the rack bar to suit the same to the size of rim which is to be carried upon the rack. The lever 52 is then released from engagement with the cross bar 9 and swung outwardly and downwardly to revolve the gear wheel 50 and raise the rack bar 33, which in turn lifts the foot 35. The spare tires and rims are then seated across the cradles 15 carried by the heads 13, and when hung in this position the lowermost portion thereof will be directly below the cradles 40 carried by the foot 35. The lever bar 52 is then swung upwardly to force the rack bar downwardly and also the foot 35 until the cradles 40 engage or seat over the rim of the tire carried upon the rack. A padlock may then be secured through the aperture of the lug 54 after the same has passed through the aperture 12 in the cross bar 9 and the spare tires and rims will then be locked securely in position upon the carrier.

When it is desired to remove a tire from a rim, the rim and tire is shifted across the cradles 15 and 40 to position the breaking point of the rim adjacent one side of the foot 35. The hook member 29 at the upper portion of the carrier is then turned to engage over the inner edge of the rim 16 as clearly shown in Figure 3, and the finger nut 32 is tightened to cause the hook to grip the edge of the rim. The lower hook member 44 is likewise turned to engage over the rim which is to be broken, and the finger nut 45 is revolved to tightly engage this hook in position, as is also shown in Figure 3. The lever 52 is now unlocked from engagement with the cross bar 9 and the same is swung outwardly and downwardly to revolve the gear wheel 50 and raise the rack 33. When the rack 33 is raised the foot 35 is naturally drawn up with it, and due to the fact that the hook 4 is carried by the foot 35, the same comes up with the foot and draws one end of the rim 16 with it, thus breaking it from engagement with the adjacent other end, as shown in Figures 1 and 3. When the rim 16 has been broken sufficiently to allow for the easy removal of the tire therefrom, the dog 55 which has previously been lifted upwardly to disengage it from the gear wheel 50, is allowed to drop until the teeth 58 formed in the lower face of the head 57 engage the teeth of the gear wheel 50 as shown in Figure 6, wedging the head 57 between the gear wheel and the outer face of the plate 5. In this position the gear wheel 50 is effectively prevented from reversing itself to allow the rack bar to slip down under the tension of the sprung rim, and both hands of the operator are free to remove the tire and repair or replace the same as desired, while the rim is held in broken position ready for the easy replacement of the tire thereon. The hook 29, during the operation of breaking the rim 16, prevents the rim from being lifted upwardly from the cradles 15 when the lower portion thereof is drawn upwardly by the hook 44.

From the foregoing description it may be seen that a novel, efficient and serviceable tire carrier and rim removing device is provided which is handy and convenient at all times, and which can be easily and quickly operated to remove a rim from a tire without the muss and hard work consequent to the removing of tires from rims as in the method at present in use.

Having thus described my invention what I claim is:

A tire carrier of the character described, comprising a plurality of heads, spaced inner and outer cradles supported across said heads, one of the heads being adjustable relative to the other, an arched bracket secured to a pair of the heads and located medially relative to the inner and outer cradles thereon, an eye on the remaining head medially thereof, adjustable and rotatable hooks carried by the bracket and eye, and adapted to be positioned alternately with respect to the inner and outer cradles, to engage rims thereon, and means for moving the adjustable head.

In testimony whereof, I affix my signature hereto.

FRANKLIN A. HAMILTON.